US008095687B1

(12) United States Patent
Amiga et al.

(10) Patent No.: US 8,095,687 B1
(45) Date of Patent: Jan. 10, 2012

(54) SYSTEMS AND METHODS FOR MANAGING STATE IN A CLUSTER OF SERVERS

(75) Inventors: Ori M. Amiga, Seattle, WA (US); Jason M. Andre, Bellevue, WA (US); Justin Grant, Seattle, WA (US); Alexander E. Mallet, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 2829 days.

(21) Appl. No.: 09/817,617

(22) Filed: Mar. 26, 2001

(51) Int. Cl.
*G06F 15/16* (2006.01)

(52) U.S. Cl. ........ 709/249; 709/248; 709/227; 709/203; 707/3

(58) Field of Classification Search .................. 709/249, 709/227, 203, 248; 707/3
See application file for complete search history.

(56) References Cited

U.S. PATENT DOCUMENTS

| | | | |
|---|---|---|---|
| 5,907,837 A * | 5/1999 | Ferrel et al. ........................ 707/3 |
| 6,058,624 A * | 5/2000 | Bach et al. ........................ 34/374 |
| 6,098,093 A * | 8/2000 | Bayeh et al. ................... 709/203 |
| 6,542,934 B1 | 4/2003 | Bader et al. |
| 6,570,845 B1 | 5/2003 | Blanc et al. |
| 6,601,128 B1 | 7/2003 | Burton et al. |
| 6,711,606 B1 * | 3/2004 | Leymann et al. ............. 709/203 |
| 6,807,580 B2 * | 10/2004 | Freeman et al. ............. 709/249 |
| 6,820,085 B2 * | 11/2004 | Nishizawa et al. ............. 707/10 |
| 6,883,105 B2 * | 4/2005 | Dutton .......................... 713/323 |
| 2002/0188730 A1 * | 12/2002 | Tang et al. .................... 709/227 |
| 2003/0191970 A1 * | 10/2003 | Devine et al. ................. 713/201 |

OTHER PUBLICATIONS

M. Aron, P.Druschel, and W.Zwaenepoel. Efficient Support for P-HTTP in Cluster-based Web Servers. In Proceedings of the USENIX 1999. 14 pages.
Valeria Cardellini, Emiliano Casalicchio, Michele Colajanni, and Philip S. Yu. The State of the Art in Locally Distributed Web-Server Systems, ACM Computing Surveys. vol. 34 Issue 2. pp. 263-311. 2002.
V.S. Pai, M. Aron, G. Banga, M. Svendsen, P. Druschel, W. Zwaenpoel, and E. Nahum. Locality-Aware Request Distribution in Cluster-based Network Servers. Proceedings of the 8th International Conference on Architetural Support for.
Witt, Jeffrey, "Balance Your Web Farm", *PC Magazine*, vol. 18, No. 15, Sep. 1, 1999, p. 75.

* cited by examiner

*Primary Examiner* — Kyung H Shin
(74) *Attorney, Agent, or Firm* — Workman Nydegger

(57) ABSTRACT

The present invention provides systems and methods that can be used to manage state on a cluster comprising a plurality of application servers. A system according to one aspect of the invention comprises a plurality of application servers each of which is equipped to process requests, host unique state, and selectively forward requests. Client requests can arrive at any of the application servers. The servers forward client requests, as needed. A target computer system identification used in request forwarding can be provided with a response to the client whenever a cluster member develops state while carrying out a client request. The client, can include the request forwarding data in subsequent requests that are part of the same session. The invention provides a standards-compliant and secure system for allowing applications servers to effectuate requests that require processing by a particular target computer system.

8 Claims, 6 Drawing Sheets

SYSTEMS AND METHODS FOR MANAGING STATE IN A CLUSTER OF SERVERS

TECHNICAL FIELD

The present invention relates generally to computer networks and in particular to a system for directing client requests among a plurality of servers.

BACKGROUND OF THE INVENTION

Many electronic businesses, such as E-Commerce and other Internet based companies, rely heavily on Internet technology. As these companies grow, they seek to expand their capacities while preserving substantial investments they may have already made in computer hardware and software. Ultimately, these companies want to provide reliable services under heavy loads.

One approach to providing powerful and reliable services is associated with large multiprocessor systems (e.g., mainframes). Since more than one processor may be involved within a large system, services can continue even if one of a plurality of processors fail. These large systems, however, can be extraordinarily expensive.

Another approach to providing high volume services involves a plurality of less expensive systems (e.g., off the shelf PCs) configured as an array or cluster to support the load. Processing requests are distributed among the members of the cluster. Clusters provide an economical hardware solution, but can present operational issues that are not usually encountered in large dedicated systems.

One such issue is dealing with process state. Process state results when a subsequent processing request builds on an earlier processing request. For example, a first processing request may have resulted in data, such as shopping cart contents, being generated. If this data is stored in a local storage media associated with an individual member of the cluster and the subsequent processing request is routed to another member of the cluster, which can happen, for example, due to efforts at balancing load among cluster members, the data will not be available to the cluster member receiving the subsequent request.

One way to deal with this issue is to build stateless applications. Stateless applications have no state and can treat each processing request as though it comes from a separate and distinct user. This approach works well in some cases, but many services do not lend themselves to implementation with stateless applications.

Another approach is to maintain session state on the client. For example the state information can be transmitted to the client in an HTTP cookie generated by the server receiving the first processing request. The client makes the cookie available to the server that receives the subsequent processing request. This approach also has its uses, but has limitations related to security and the amount of state data that can be stored in this manner.

A further approach employs software to redirect processing requests. The environment for this software is typically a cluster of web servers sharing a logical Internet address. When a cluster member receives a request for processing that involves state, the client is provided with the IP address of an individual cluster member and directed to resubmit the request to that cluster member. This approach requires all the applications on the cluster that present links to use relative addressing and avoid having the client use the host name a second time over the course of the session. With this approach, state is usually lost once the connection with the client is broken. Another consequence is that the client may end up book-marking an individual cluster member's address, rather than the cluster address. If the individual member is unavailable when the client returns, the client will get an error such as "Host not found" rather than being routed to another cluster member.

A further approach employs hardware that routes all requests directed to the cluster. Commercially available routers, support what are called "sticky" connections, whereby requests from a specific client are routed to the same server if they arrive within a certain period of time, 5 minutes for example. Because such routers must handle large volume of traffic, they are generally expensive. They also create a point of weakness for a cluster in that if the router goes down, the entire cluster becomes unavailable. When intervals of "stickiness" are limited, state can still be lost if the session lasts beyond the stickiness interval.

Yet another approach is to maintain session state on a database to which all of the servers have access. Cookies, stored by the clients, can be used to identify the required session state and retrieve it from the database. This solution is also effective in many circumstances, but presents its own host of issues. The shared database requires additional hardware that can be expensive to buy and maintain, and load balancing can become an issue when the database is being accessed by a large number of servers.

Thus, in spite of a variety of attempts, there remains an unsatisfied need for an inexpensive, flexible, and reliable system for handling session state in a clusters of servers.

SUMMARY OF THE INVENTION

The following is a simplified summary of the invention in order to provide a basic understanding of some of its aspects. This summary is not an extensive overview of the invention and is intended neither to identify key or critical elements of the invention nor to delineate its scope. The sole purpose of this summary is to present some concepts of the invention in a simplified form as a prelude to the more detailed description that is presented later.

The present invention provides systems and methods that can be used to manage state on a cluster comprising a plurality of application servers. A system according to one aspect of the invention comprises a plurality of application servers each of which is equipped to process requests, host unique state, and selectively forward requests to any of the other application servers. Client requests can arrive at any of the application servers. The servers forward client requests, as needed.

When an application server in a system of the invention develops a unique state while carrying out a client request, the application server includes request-forwarding data in its response to the client. The client, in turn, includes the request forwarding data in subsequent requests that are part of the same session. The invention provides a standards-compliant and secure system for handling state.

In another of its aspects, the invention provides a system whereby a cluster of application servers can manage any type of client request that may require processing by a particular computer system. The cluster member receiving the request forwards the request, as necessary, based on the nature of the request. For example, if the request is for publication, the request can be forwarded to a server from which the data is eventually replicated to the entire cluster. If the request is for an administrative action, the request can be forwarded to a server charged with administering the cluster. The process is entirely transparent to the client and allows functions to be shifted among cluster members without the client ever knowing.

Other advantages and novel features of the invention will become apparent from the following detailed description of the invention and the accompanying drawings. The detailed description and drawings provide certain illustrative examples of the invention. These examples are indicative of but a few of the various ways in which the principles of the invention can be employed.

DETAILED DESCRIPTION OF THE INVENTION

Figure 1:
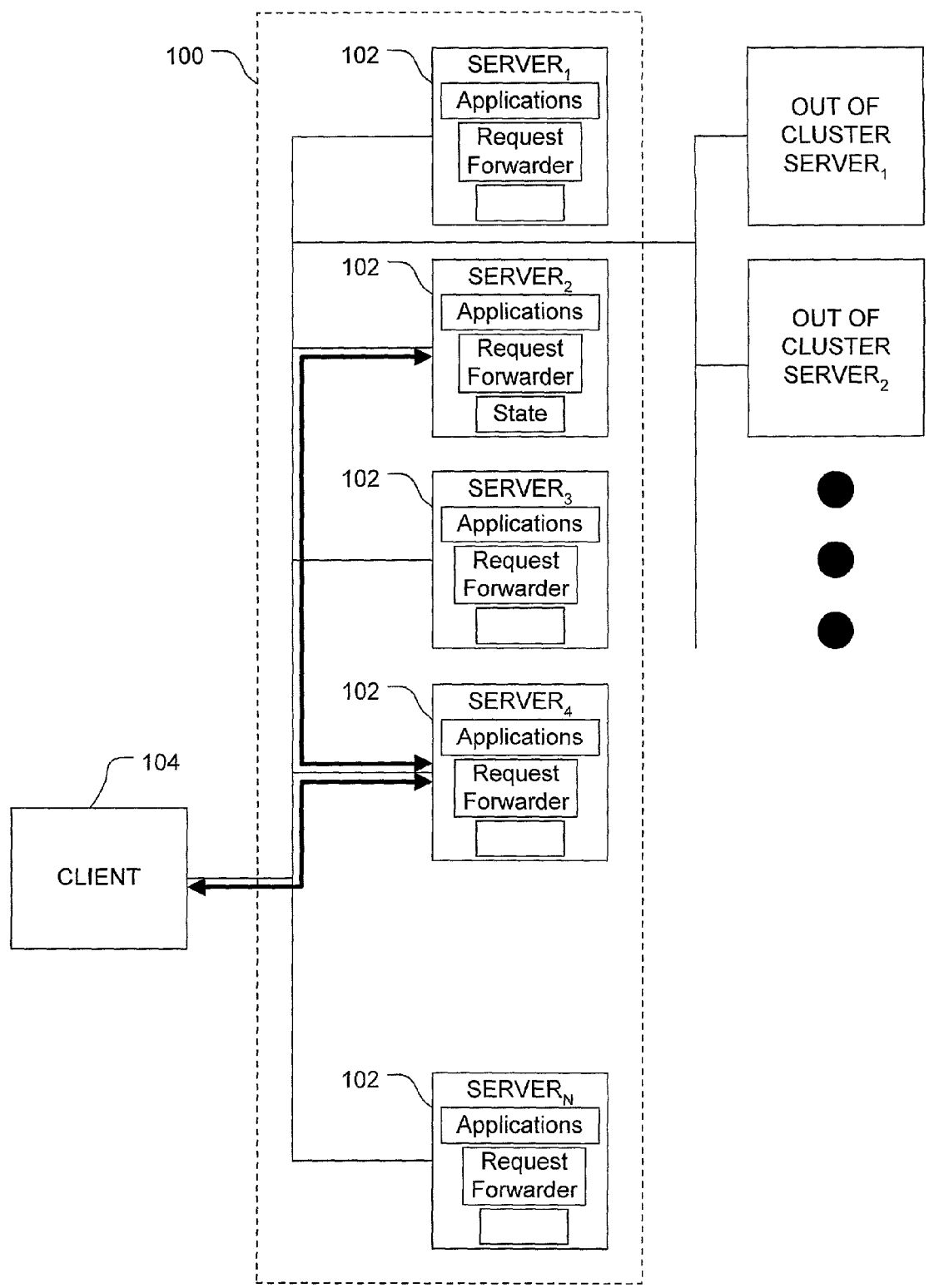
FIG. 1 is a high level schematic of a server system provided by one aspect of the present invention.

FIG. 1 is a high level schematic of a server system 100, which is provided by one aspect of the present invention. The system 100 includes a plurality of computer systems 102 networked together and configured as application servers. Each of the computer systems 102 provides an interface component that is adapted to receive requests that originate from client 104 and other clients. The requests can arrive at any of the computer systems 102. In FIG. 1, an exemplary request is illustrated as arriving at $SERVER_4$.

The requests that the computer systems 102, through their interface components, are adapted to receive can originate with client 104. Client 104 is a program that establishes network connections and can initiate requests. The client can be an HTTP user agent. Clients can include human-driven user agents or automated user agents. The client can be, for example, a browser, an editor, a spider (a web-traversing robot), an information retrieval system, or a mobile phone. The requests can be of any type, including requests for static processing, which do not create or employ state that persists over multiple requests, and requests for dynamic processing, which do create or employ state that persists over multiple requests. While the invention is not limited to any particular request format, the invention can be configured to work with HTTP requests satisfying HTTP protocol.

Computer systems 102 are application servers in that computer systems 102 host applications set up as targets for client requests. The requests can also be for special action, which is defined to be publication, administration, or other function that only one or a limited number of computer systems are designated to carry out.

Requests for special action are examples of what are termed special processing requests. Special processing requests are requests that in order to be carried out most effectively require participation of a target computer. The target computer system can be among the computer systems 102, which form a cluster. The target computer system can also be outside the cluster, as illustrated by OUT OF CLUSTER $SERVER_1$ and OUT OF CLUSTER $SERVER_2$ in FIG. 1. The target computer is a computer that is designated to carry out certain function or hosts state that is needed to most effectively fill the processing request. For example, each of the computer systems 102 can host unique state data and be the target computer system. In FIG. 1, the example request builds upon state that is present only on $SERVER_2$.

State refers to a state of execution or data content. For example, if a server provides a shopping cart, the state can include data that defines the contents of the shopping cart. If a client added contents to the shopping during a previous request, subsequent requests by the client that are related to shopping may require the shopping cart contents to be carried out most effectively. State information can include client information, such as form contents or the username associated with an email inbox.

The meaning of "carried out most effectively" depends on the type of request and is generally self-evident. Where the request builds upon previously created state, the subsequent request requires the previously created state to be most effectively executed. Returning to the shopping cart example, if the subsequent request involves the selection of another item for the shopping cart, the request could be satisfied by creating a new shopping cart, but to most effectively carry out the request, the item is added to the shopping cart containing the previously selected items. Likewise, a request for publication might be carried out on any server receiving the request and thereby be available to those users who happened to arrive at that particular server, but to most effectively carry out the publication request, it may be necessary for the request to be carried out by a computer system that is able to replicate the publication to every member of the cluster.

When one of the computer systems 102 (the "receiving computer system") receives a special processing request, the receiving computer system identifies the target computer system and communicates with the target computer system to effectuate the request. The receiving computer system identifies the target computer system based on the nature of the special processing request and/or based on an identification of the target computer contained with the special processing request. For example, if the special request is for publication, the receiving computer system can identify the target of the request as a particular computer system from which data is eventually replicated throughout the cluster.

An identification of the target computer system contained with the special processing request can be any data that uniquely identifies the target computer. For example, the identification can be the IP address for the target computer system or a logical name for the target computer system that the receiving computer system can employ to determine an address for the target computer system. The identification can be packaged with the request in any suitable manner. For example, the identification can be contained in an HTTP cookie.

The receiving computer system can communicate with the target computer system in any suitable manner. For example, a standards compliant manner of communicating with the target computer can be to generate an HTTP request. The network and each of the computer systems 102 are configured to permit communication between any one computer system 102 and any other computer systems 102. Computer systems 102 are optionally configured to also communicate with one or more out of cluster computer systems.

The receiving computer system effectuates special process requests by either forwarding them to the target computer or obtaining the state information from the target computer and carrying the requests out. Forwarding is the more common approach. Forwarding works with all types of state, including states of execution and object reference data. Forwarding is transparent to the applications that carry out the requests—no modification is needed even if the applications are imported from a system that does not utilize the present invention.

On the other hand, with respect to special requests involving state, there are instances where the state can be effectively downloaded from the target computer system. For such instances, the target and receiving computer systems can be configured to permit the receiving computer system to effectuate special requests by downloading the state. In this configuration, the receiving computer system can effectively recreate the state, whereby the receiving computer system can carry out the request without forwarding.

Forwarding the requests, rather than downloading state information, permits applications that have state and were developed for single computer system environments to be used on clusters of computer systems without modification. If the requests are forwarded, the applications can function just as they did in a single computer environment and computer instructions according to the present invention can be written without reference to particular applications. If, however, state information is to be downloaded, then in general the applications are either modified to input and output state in a standard format, or, where possible, computer instructions according to the present invention are designed with reference to particular applications.

The computer systems 102 are configured to generate, upon executing a request that creates state, a response for the client that includes an identification of the computer system that has the state. The information can be encoded in any suitable fashion and can be contained in any suitable part of the response, in an HTTP cookie, for example.

The client is expected to include the information provided with the response in subsequent processing requests that build upon the state. Generally, a subsequent client request is a data packet transmitted between at least two computers and containing at least three data fields. A first data field identifies the type of processing being requested. For example, it can identify a particular application being called upon. A second data field identifies an addressee for the request. The addressee can be, for example, a cluster identified by a single virtual address. A third data field contains the request forwarding information and identifies the target computer system that contains the state data. The data packet can be an HTTP request, for example, with request forwarding information contained in a cookie.

Figure 2:
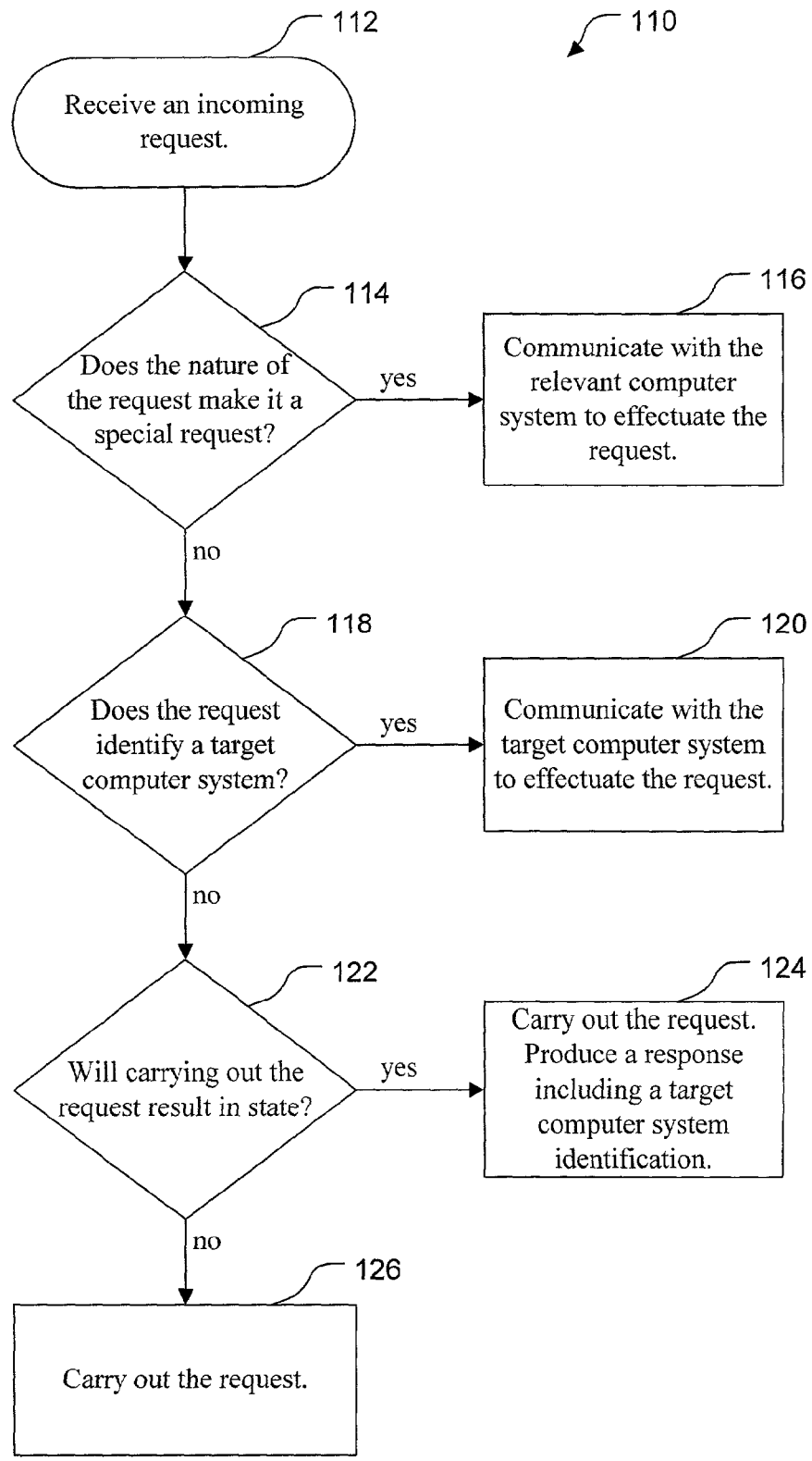
FIG. 2 is a flow chart of a method provided by another aspect of the present invention.

FIG. 2 is a flow chart of a method of managing state 110 provided by another aspect of the present invention. This method is computer implemented and is carried out by application servers in a cluster. The application servers filter the incoming requests for special requests and communicate with target computer systems to effectuate the special requests. The method begins with act 112, receiving an incoming request. Act 114, which is next, is a filtering action. Act 114 is determining whether the nature of the request makes it a special request. If the request is a special request, the method proceeds with act 116, which is communicating with the relevant computer to effectuate the request. If not, the method continues with act 118.

Act 118 is another filtering action; determining whether the request identifies a target computer system. If the request does identify a target computer system, the method proceeds with act 120, communicating with the target computer system to effectuate the request. Otherwise, the method proceeds with act 122, which is determining whether carrying out the request will produce state.

If carrying out the request will produce state, the method proceeds to act 124, which is carrying out the request and generating a response that include an identification of the computer system carrying out the request. The response, or portion of the response, that include the identification can be carried out either before, during, or after the process of carrying out the request. The computer system carrying out the request will be the target computer system for subsequent requests that build upon the created state.

If act 122 determines that carrying out the request will not produce state, the method proceeds with act 126, which is simply carrying out the request.

A further aspect of the invention is a computer readable medium having computer executable instructions for configuring a server to handle special requests. The computer readable medium includes instructions for filtering and forwarding requests. In one aspect of the invention, the instructions forward requests where the nature of the requests determines a target computer system. In another aspect of the invention, the instructions forward requests when they contain a target computer system identification. Additional instructions can also be included for providing a target computer system identification in a response that follows execution of a processing request that produces state. The instructions can be, for example, instruction that create an HTTP cookie that contains the target computer system identification.

Figure 3:
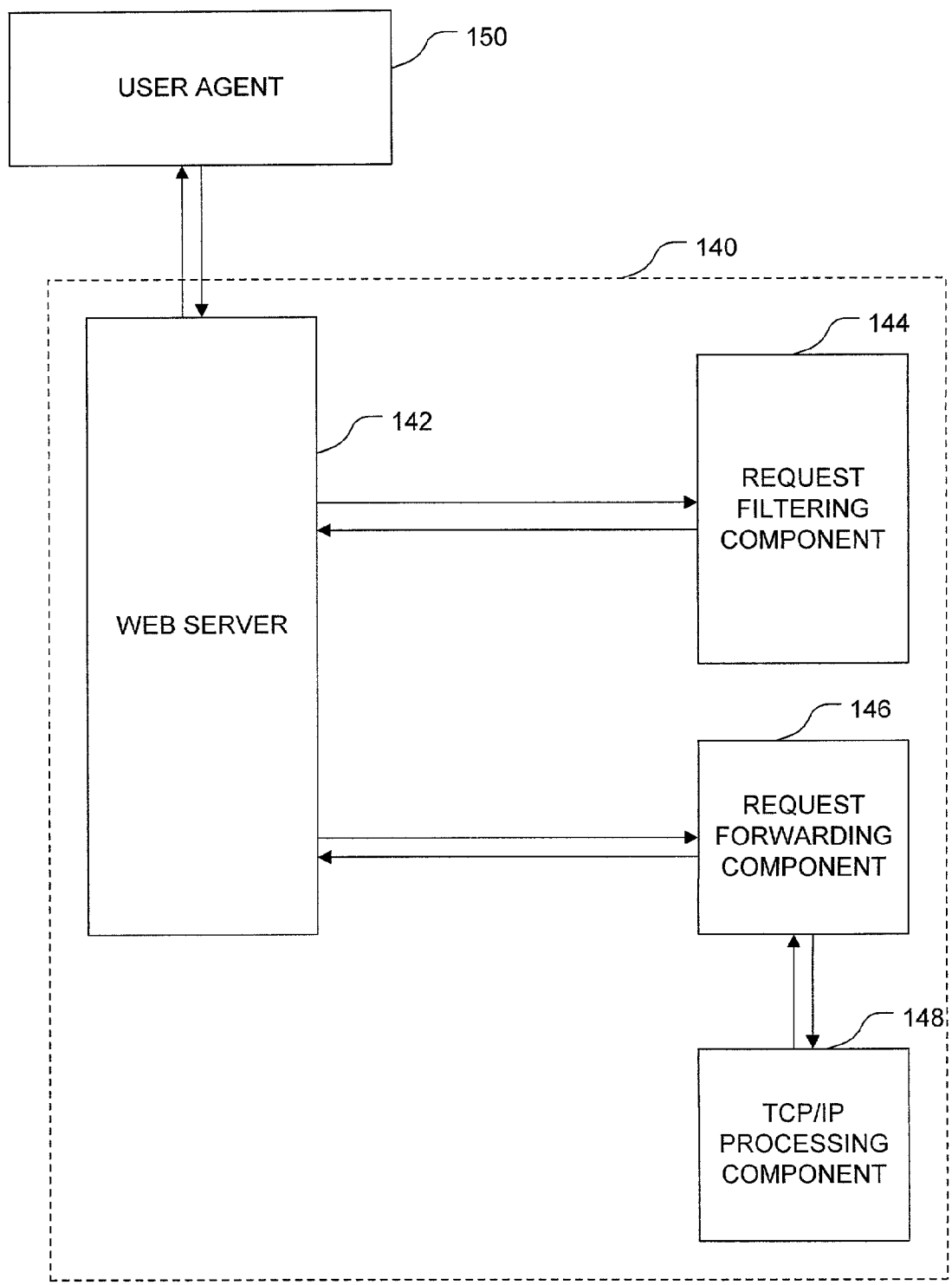
FIG. 3 is a high level schematic of an application server forming part of a system of the present invention.

FIG. 3 is a high level schematic of an exemplary computer system 140 of the present invention. Computer system 140 is a member of a cluster. A cluster is a plurality of computer systems networked. A plurality of the cluster members each comprise the illustrated software components. These software components including web server 142, request filtering component 144, request forwarding component 146, and TCP/IP processing component 148.

Web server 142 receives HTTP requests from user agent 150. The HTTP requests comprise URLs and optionally HTTP cookies and other data. After decrypting the requests, or portions thereof, where necessary, web server 142 sends the requests to request filtering component 144. Request filtering component 144 determines whether the request is to be forwarded. If it is, request filtering component 144 passes control to request forwarding component 146, or alternatively, provides a signal or other indication that the request is to be processed by request forwarding component 146. For example, request filtering component 144 can modify the URL of the request in a manner that is recognized by web server 142, which then sends the request to request forwarding component 146. Request forwarding component 146 communicates with the request target using TCP/IP processing component 148 to forward client data to the target and return responses from the target to user agent 150 through web server 142.

In this example, request filtering component 144 can determine whether to forward the request based on the Request-Line portion of an HTTP request. For example, the Method portion of the URL can often be used to identify publishing requests, and the file extension on the Request-URI often aids in distinguishing static and dynamic processing requests. Request filtering component 144 can maintain a list of known static file types, which can generally be processed without forwarding. Where a file type is not static, it can be assumed to be dynamic. If the request has a dynamic file type and does not contain a cookie identifying a target computer system, request filtering component 144 can create a new cookie providing an identification of computer system 142 for use in subsequent requests. If the request has a dynamic file type and contains a cookie identifying a target computer system, request filtering component 144 takes steps causing request forwarding component 146 to forward the request to the target computer system.

Figure 4:
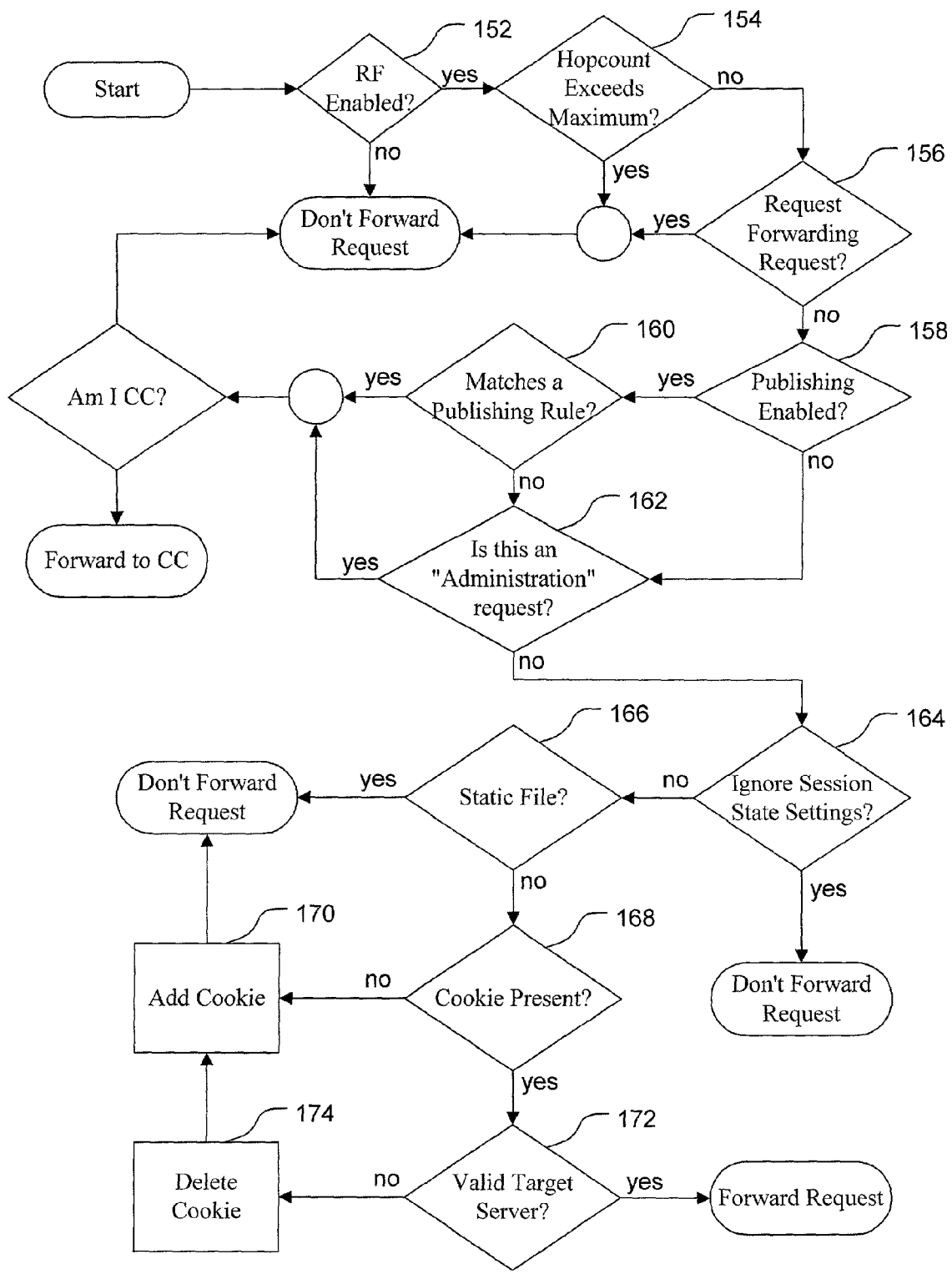
FIG. 4 is a flow chart showing the operation of an exemplary request filtering component provided by a further aspect of the present invention.

A more detailed example of a request filtering component is provided by the flow chart in FIG. 4. After the start, the first action, act 152, is to determine whether request forwarding is enabled. If it is not enabled the request is not forwarded. If request forwarding is enabled, the process continues with act 154.

Act 154 prevents request forwarding if Hopcount exceeds a maximum value. Hopcount is a variable that is conveyed with the request and is incremented each time the request is forwarded. Checking the Hopcount excludes the potential for a request to be forwarded circularly without end.

In this example, the request filtering component forwards requests by modifying them in such a way that they are subsequently processed by a request forwarding component. The modified requests are recognized by information or tags placed in their URLs. A hacker might create a request mimicking such a modified URL. To defeat such action, the request filtering component includes act 156, which prevents forwarding of requests that arrive with the invalid information or tags.

Act 158 is determining whether publishing is enabled. If so, the request is checked in act 160 to see if it matches a publishing rule. If it does, the request is forwarded to where it will be published. In this example, there is a cluster member called the cluster controller. Information published on the cluster controller is eventually replicated throughout the cluster. Therefore, all publication requests are directed to the cluster controller. Administration requests, such as HTMLA site administration requests, are also handled by the cluster controller. Act 162 is checking whether the request is an administration request and if so, forwarding the request to the cluster member responsible for administration.

If the nature of the request does not dictate a target computer system, the request may still be forwarded based on session state. Act 164 is checking whether to ignore session state. If session state is to be ignored, the request is not forwarded. Otherwise, act 166 checks the file type in the URL to determine whether it matches any of a list of static file types maintained by the request filtering component. If the request file type matches one of the static file types, the request is not forwarded on the basis of session state.

If the request file type does not match any of the static file types, it is assumed that the request has a dynamic file type. Act 168 is checking whether the request contains a cookie identifying a target computer system. If there is not such a cookie, act 170 adds a cookie identifying a target computer system and the request is not forwarded. If there is a cookie identifying a target computer system, act 172 checks whether the identified target computer system is valid. If it is valid, and the receiving computer system is not the target computer system, the request is forwarded. If the identified target computer system is not valid, the cookie is deleted in step 174, a new cookie identifying the receiving computer system is added in step 170, and the request is not forwarded.

Figure 5:
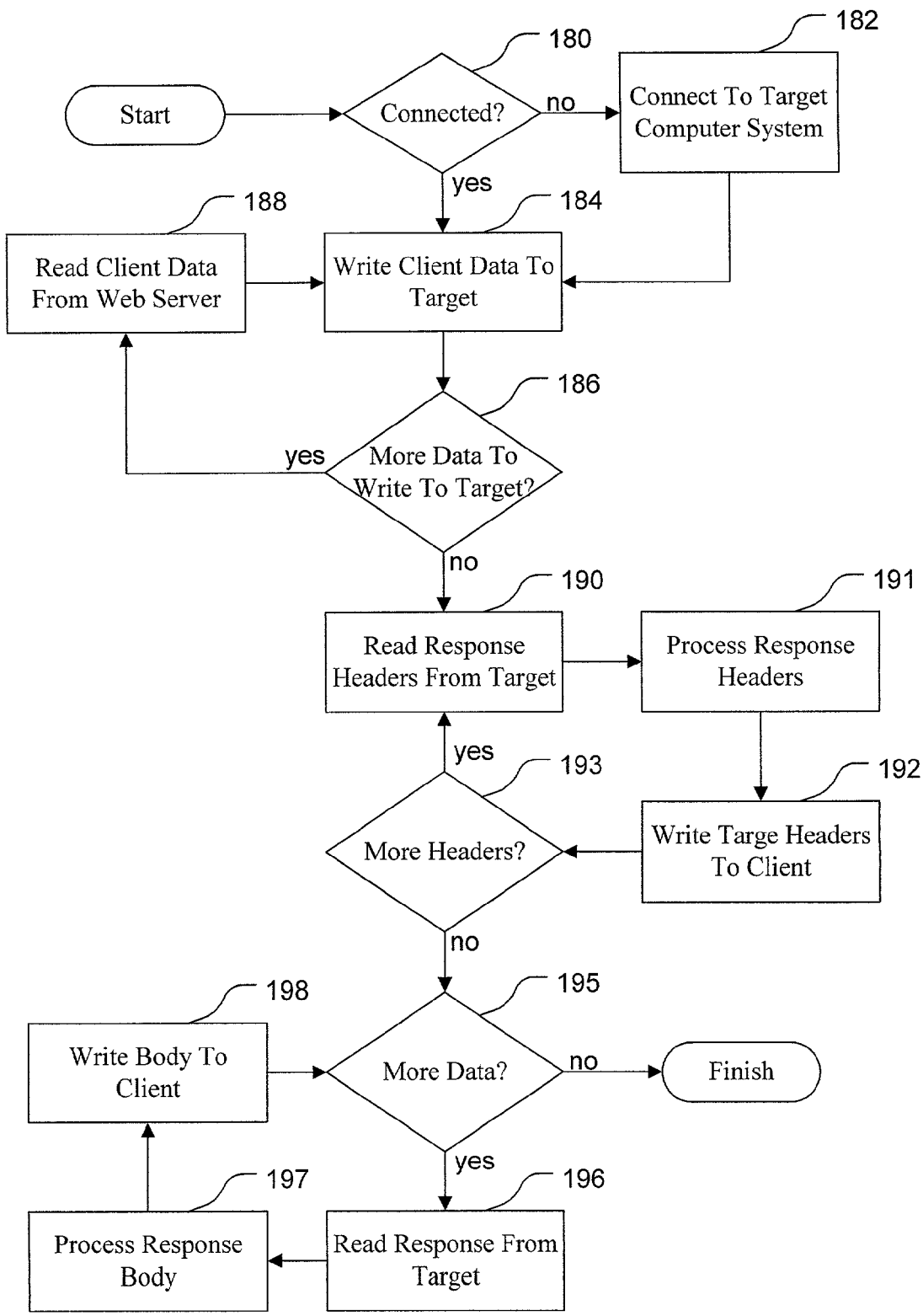
FIG. 5 is a flow chart showing the operation of an exemplary request forwarding component provided by a further aspect of the present invention.

FIG. 5 is a flow chart providing an example of a request forwarding component. After the start, the first action of the request forwarding component is act 180, determining whether the receiving computer system has a connection to the target computer system. If not, the act 182 establishes a connection.

Acts 184, 186, and 188 write the client data to the target. Act 184 is writing a block of data. Act 186 is determining whether there is more client data to write. Act 188 is obtaining additional client data from the web server.

Acts 190, 191, 192, and 193 obtain response headers from the target computer system, process them, and write them to the client. Act 190 is reading a group of response headers from the target computer system. Act 191 is processing the response headers, as needed. Act 192 is writing the group of response headers to the client. Act 193 checks to see if there are more response headers and causes the actions to repeat until all response headers have been read.

Acts 195, 196, 197, and 198 obtain addition response data from the target computer system, process it, and write it to the client. Act 196 is reading response data from the target computer system. Act 197 is processing the response data, as needed. Act 198 is writing the response data to the client. Act 195 checks to see if there is more response data and causes the actions to repeat until all the response data has been read.

Figure 6:
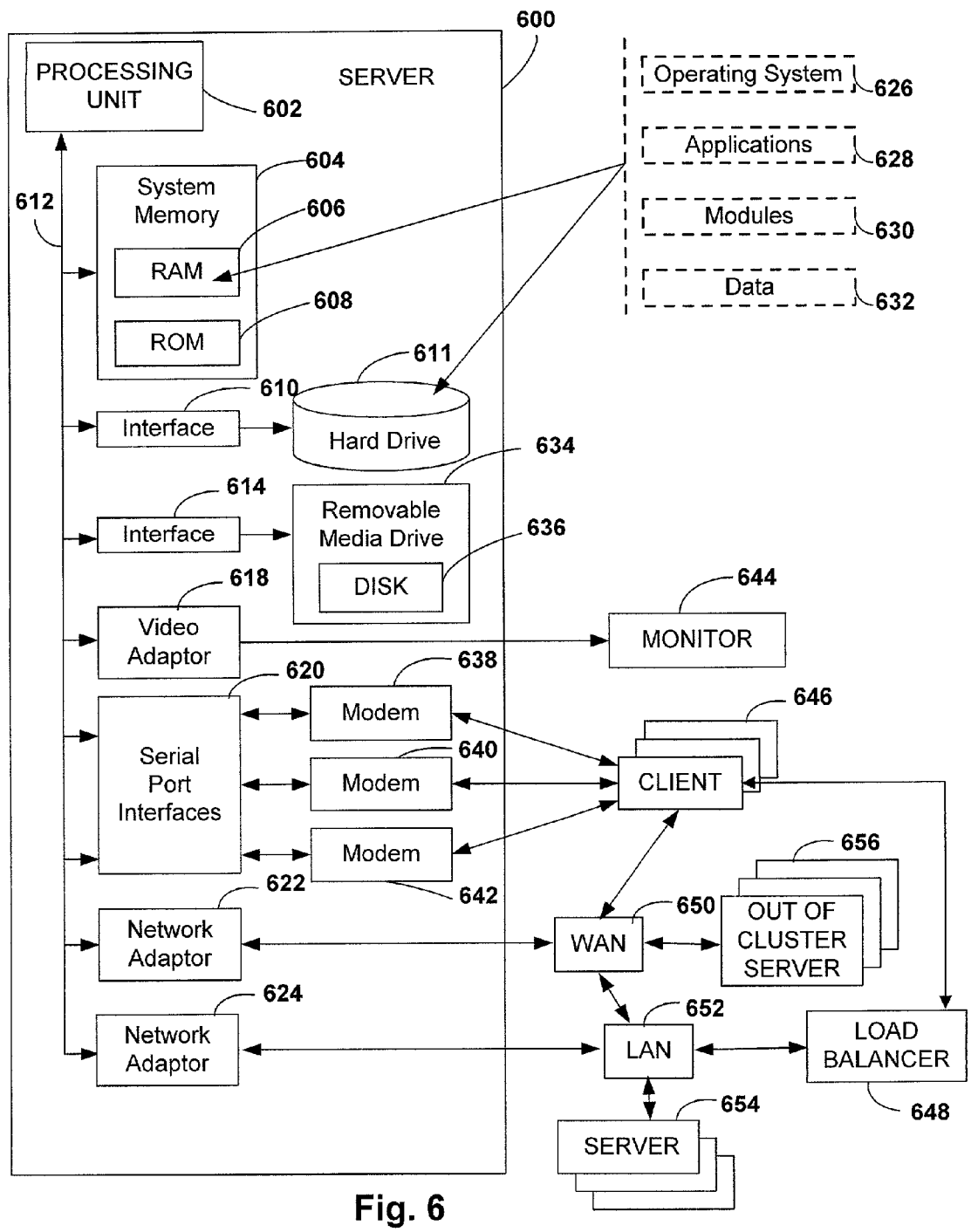
FIG. 6 is a schematic of an exemplary application server and operating environment of the present invention.

The application servers of the present invention are computer systems comprising one or more applications programs that carry out client requests. FIG. 6 is a schematic of an exemplary application server 600 of the present invention. Application server 600 is a conventional computer comprising a processing unit 602, a system memory 604, and a system bus 612 that couples various system components including the system memory 604 to the processing unit 602. The processing unit 602 can be any of various commercially available processors. Dual microprocessors and other multi-processor architectures also can be used as the processing unit 602.

System bus 612 can include a memory bus or memory controller, a peripheral bus, and a local bus using any of a variety of commercially available bus architectures. The system memory 604 includes read only memory (ROM) 608 and random access memory (RAM) 606. A basic input/output system (BIOS), containing the basic routines that help to transfer information between elements within the computer 600, such as during start-up, is stored in ROM 608.

The server 600 further includes a hard disk drive 611, a removable media drive 634, e.g., to read from or write to a removable disk 636. The hard disk drive 611 and removable media drive 634 are connected to the system bus 612 by a hard disk drive interface 610 and a removable media drive interface 614, respectively. The drives and their associated computer-readable media provide nonvolatile storage of data, data structures, computer-executable instructions, etc. for the server 600. One or more removable media drives 634 can support, optical disks, magnetic disks, magnetic cassettes, flash memory cards, digital video disks, Bernoulli cartridges, and/or other types of computer-readable media. A number of program modules are stored in the drives and RAM 606, including an operating system 626, one or more application programs 628, other program modules 630, and program data 632.

Although not illustrated, server 600 can receive commands through a keyboard, a mouse, or other input device. A monitor 644 or other type of display device is connected to the system bus 612 via an interface, such as a video adapter 618.

The computer 600 operates in a networked environment using logical connections to one or more remote computers, such as clients 646, servers 654, and out-of-cluster servers 656. Servers 654 can include many or all of the elements described relative to the computer 600. Servers 654 can also include additional elements. Server 600 together with servers 654 form a cluster.

The logical connections depicted in FIG. 6 include a local area network (LAN) 652, wide area network (WAN) 650, and modems 638, 640, and 642. Server 600 is connected to LAN 652 through a network interface or adapter 624. Server 600 is connected to WAN 650 through network adapter 622 and also through LAN 652. Server 600 is connected to modems 638, 640, and 642 through serial port interfaces 620.

Server 600 communicates with servers 654 through LAN 652. Clients 646 can communicate with server 600 through modems 638, 640, 642, through WAN 650, or through LAN 652. Requests from clients 646 to server 600 can arrive through load balancer 648. Load balancer 648 direct requests to either server 600 or one of servers 654. Load balancer 600 can be employed to distribute requests evenly among server 600 and servers 654. Server 600 can communicate with out-of-cluster servers 656 through WAN 650.

The present invention is described with reference to acts and symbolic representations of operations that are performed by the computer 600, unless indicated otherwise. Such acts and operations are sometimes referred to as being computer-executed. These acts and operations include the manipulation by the processing unit 602 of electrical signals representing data bits which causes a resulting transformation or reduction of the electrical signal representation, and the maintenance of data bits at memory locations in the memory system (including the system memory 604, hard drive 611, and disks 636) to thereby reconfigure or otherwise alter the computer system's operation, as well as other processing of signals. The memory locations where data bits are maintained are physical locations that have particular electrical, magnetic, or optical properties corresponding to the data bits. Various programming methodologies and/or computer architectures suitable for carrying out the present invention can be employed and fall within the scope of the claims.

As used in this application, "system" is a structure comprising one or more components. A "component" is a structure comprising computer hardware and/or software. For example, a component can be, but is not limited to, a computer readable memory encoded with software instructions or a computer configured to carry out specified tasks. By way of illustration, both an application program stored in computer readable memory and a server on which the application runs can be components. Due to the nature of components, multiple components can be intermingled and are often not separate from one another. Systems can likewise be intermingled and inseparable.

The invention has been described with reference to particular aspects of the invention. Obviously, modifications and alterations will occur to others upon reading and understanding the foregone detailed description. It is intended that the invention be construed as including all such modifications alterations, and equivalents thereof.

The invention claimed is:

1. A server system, comprising:
a plurality of computer systems functioning as application servers and networked together, the plurality of computer systems receiving requests from clients;
wherein, upon processing a request from a client that results in a session state, a computer system includes identifying data in a response to the client, the identifying data identifying the computer system that hosts the session state for that client,
wherein the client includes the identifying data in subsequent requests that are part of the same session; and
wherein a computer system that receives a request having the identifying data utilizes the identifying data to facilitate processing the request having the identifying data.

2. The server system of claim 1, wherein facilitating processing the request having the identifying data comprises forwarding it to the computer system that hosts the session state for that client.

3. The server system of claim 1, wherein facilitating processing the request having the identifying data comprises obtaining session state from the computer system that hosts the session state for that client and carrying out the request.

4. The server system of claim 1, wherein the identifying data is contained in an HTTP cookie.

5. A computer readable device having computer executable instructions to be executed by one or more of a plurality of computer systems functioning as application servers and that are networked together, the computer executable instructions being configured, when executed, to implement a method comprising:
receiving a request from a particular client, wherein the request, when processed, results in a session state for a particular session for the particular client;
generating the session state during the processing of the request that is hosted by a target computer system from among the plurality of computer systems;
sending identifying data to the client that identifies the target computer system hosting the session state;
receiving subsequent incoming requests from one or more clients, wherein the particular client includes the identifying data that identifies the target computer system in one or more of the subsequent incoming requests that correspond to the particular session;
filtering the subsequent incoming requests to determine which of the subsequent incoming requests include the identifying data that identifies the target computing system and which require participation of the target computer system; and
utilizing the identifying data to facilitate processing the one or more of the subsequent incoming requests having the identifying data by at least communicating with the target computer system.

6. The computer readable medium of claim 5, wherein communicating with the target computer system comprises forwarding at least one of the one or more of the subsequent incoming requests to the target computer system.

7. A method of handling requests in a cluster of application servers, each server in the cluster having a request filtering component and a request forwarding component, comprising: receiving a request from a client computer;
generating a state during processing of the request;
including forwarding data in a reply to the client computer, the forwarding data indicative of a target computer to receive later requests from the client that are associated with the state; filtering subsequent requests to identify those with forwarding data; and
forwarding a subsequent request to the target computer if the subsequent request contains forwarding data.

8. The method of claim 7, wherein filtering further comprises determining whether a nature of the subsequent request makes the subsequent request a special request.

* * * * *